Patented Apr. 28, 1953

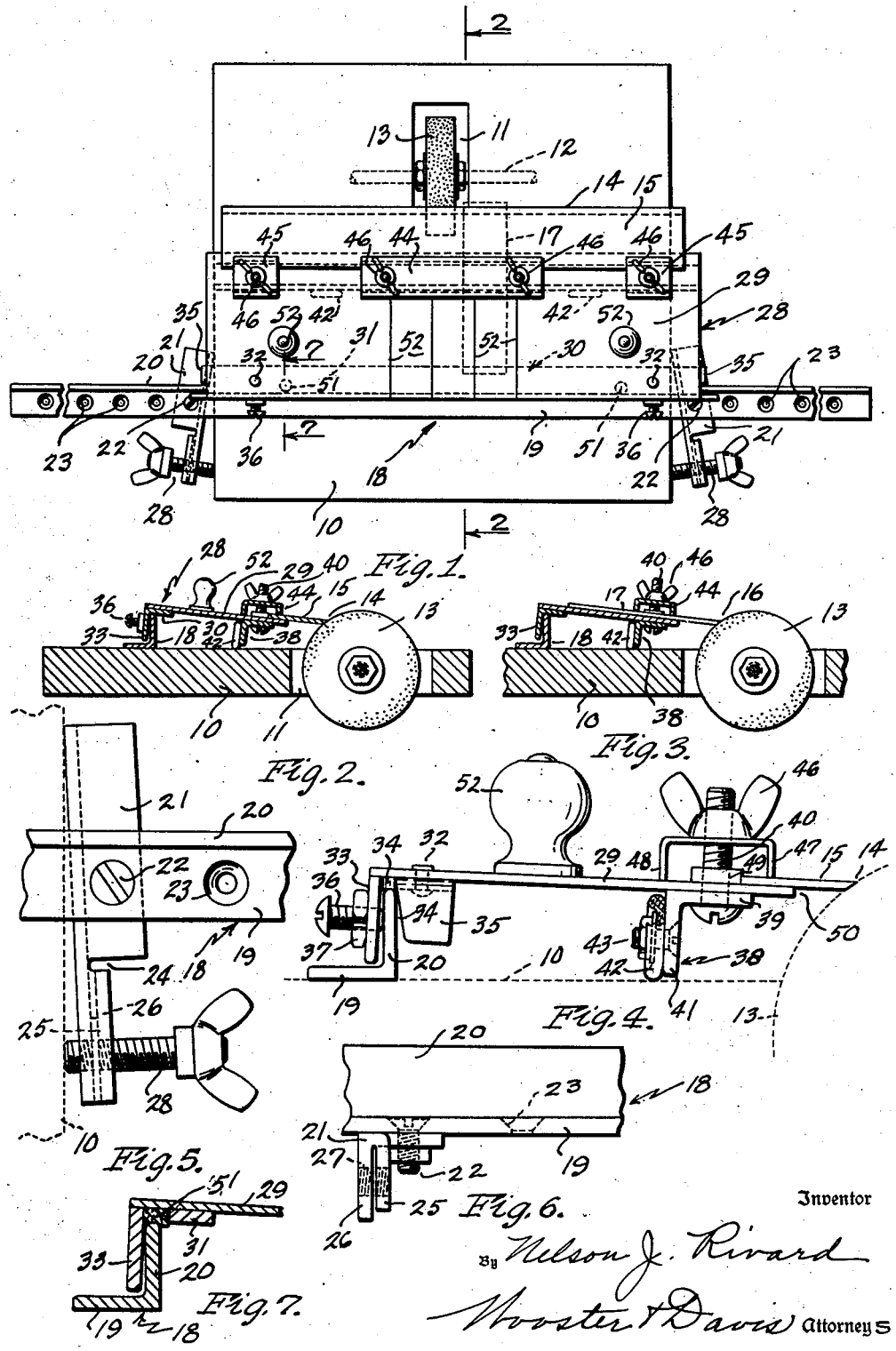

2,636,326

UNITED STATES PATENT OFFICE 2,636,326

GRINDING ATTACHMENT FOR STRAIGHT EDGE WOOD TOOL BLADES

Nelson J. Rivard, Milford, Conn.

Application September 18, 1951, Serial No. 247,142

6 Claims. (Cl. 51—224)

1

This invention relates to a grinding attachment for straight edge wood tool blades, and has for an object to provide a simple and effective means for accurately grinding the blades of wood-working tools, such, for example, as the blades of the rotary cutter of planers, flat blades of hand planes, chisels, and the like.

Another object is to provide a device of this character which may be mounted on the table of a saw or similar device with a simple operation and hold the blade to be ground in position to engage and be moved across the face of a grinding wheel mounted in the table in place of the saw.

With the foregoing and other objects in view, I have devised the construction illustrated in the accompanying drawing forming a part of this specification. It is, however, to be understood the invention is not limited to the specific details of construction and arrangement shown but may embody various changes and modifications within the scope of the invention.

In this drawing:

Fig. 1 is a top plan view of the device showing it mounted on the saw table in position for grinding a blade;

Fig. 2 is a transverse section substantially on line 2—2 of Fig. 1;

Fig. 3 is a similar section showing the device used for a different type of blade;

Fig. 4 is an end view on an enlarged scale with parts broken away to more clearly show the construction;

Fig. 5 is a top plan view of the clamp for the device;

Fig. 6 is an end view of this clamp with the clamping screw removed, and

Fig. 7 is a detail section substantially on line 7—7 of Fig. 1.

In the drawing the device is shown as mounted on a bed or table 10 of a wood saw, the saw used with the table when used as a saw being located in the opening 11 operating on a transverse shaft 12 driven from any suitable means (not shown). Before using this device the saw is removed and the grinding wheel 13 substituted for it on the shaft so as to be driven by the same means. Then this device is clamped to the table 10 for grinding the blade on this wheel. In Figs. 1, 2 and 4 it is shown as grinding the long edge 14 of a long flat blade 15, such, for example, as one of the blades of a rotary cutter, in a planar. In Fig. 3 it is shown as grinding the edge 16 at one end of an elongated flat blade 17 of the type used in a hand plane, for example, the position of this blade being shown in dotted lines in Fig. 1.

The device comprises a guide bar 18 to rest on the top of the table 10 and be clamped thereto. Although this bar may be of different shapes it is preferably an angle bar comprising a horizontal flange 19 to rest on top of the table and an upright guide flange 20. Means is provided for clamping this bar to the table, that shown being a very simple and effective means for this purpose. It comprises a clamp 21, also preferably a piece of angle iron, pivoted intermediate its length by a screw 22 passing through one of a series of openings 23 in the horizontal flange 19 of the bar. The top or horizontal flange of the member 21 is cut transversely, as shown at 24, and the flange bent downwardly as shown at 25, to lie over the upright flange 26. Then a hole 27 is drilled and tapped through these flanges for the clamping screw 28, which is preferably a thumb screw as shown so it can be operated by hand without tools. By screwing up this thumb screw to clamp its free end against the table the opposite end of the member 21 is also clamped against the table, thus providing a very simple and effective means for clamping the bar 18 to the table. By means of a series of holes 23 the clamps may be adjusted to different positions on the bar 18 to clamp the device on tables of different widths. These clamps are easily released by merely unscrewing the thumb screws 28 to permit removal of the device from the table. The two flanges 25 and 26 permit a greater length of thread for the screw without requiring the addition of a washer or block for this purpose.

The holder 28 for the blade is mounted to slide longitudinally on the top of the guide bar 18 and the table top. It preferably comprises a plate 29 on the under side of which it is provided with guide means cooperating with the upright flange 20 of the bar 18. A simple and effective guide means comprises an angle bar 30 including a horizontal flange 31 secured to the under side of the plate 29 by any suitable means such as the rivets 32, and the other flange 33 extending downwardly at one side of the flange 20. At its opposite ends the top flange 31 is cut longitudinally as shown at 34 and the end of this flange bent downwardly to form a guide lug 35, so that with the flange 33 on the outer side of the flange 20 and the lugs 35 on the opposite or inner side of this flange, they provide guide means cooperating with the flange 20 to guide the holder 28 for movement longitudinally of the bar 18 while resting on the top edge of the flange 20 of this bar. The cut 34 is preferably tapered, as indicated in Fig. 4, and made somewhat wider than the thickness of the flange 20 to provide a certain amount of clearance between this guide means and the flange 20, and thus permit limited vertical rocking movement of the holder 28, so that the blade being held by the holder may yield somewhat with irregularities in the grinding wheel. The amount of this movement may be adjusted by means of adjustable screws 36 mounted in the upright flange 33 to engage the outer side of the flange 20, and held in adjusted positions by lock nuts 37. It is preferred to use two of these screws 36 located adjacent opposite ends of the table, as shown in Fig. 1.

Located forwardly of the guide bar 18 the holder 28 and plate 29 are guided and supported on the top of the table by a second guiding and supporting means. Although this may be of different shapes it is preferably also an angle bar 38 having a horizontal flange 39 secured to the under side of the plate 29 by the clamping screws 40, and its upright flange 41 either resting on or supported a slight distance above the top of the table 10. Its lower edge may rest directly on this table or felt fiber pads 42 may be mounted on this flange by any suitable means, such as screws 43, with their lower edges engaging the top of the table, and with these pads saturated with oil they provide a lubricating means as well as a resilient slightly yielding means to support the forward portion of the plate 29 on the table.

Means is provided for clamping the blade on the holder 28 and plate 29 in position for the grinding operation. The clamp shown is a very simple and effective one comprising inverted channel shaped members 44 and 45 of any suitable lengths. For clamping the long flat blade 15 it is preferred to use three of these members as shown in Fig. 1 with a relatively long clamp 44 in the center and shorter clamps 45 at the opposite ends to thoroughly clamp the blade for its full length, and they are set up or clamped on the blade by suitable thumb nuts 46 on the screws 40. Thus with the edge of one flange 47 resting on the blade and the edge of the other flange 48 either resting on the top of the plate 29 or a shim or spacer plate under it, not shown, setting up the thumb nuts 46 will effectively tighten and clamp the blade on the plate 29. Means is provided for also easily and quickly positioning and lining up the blade for accurate grinding. In the present arrangement this comprises nuts 49 on the screws 40 providing limit and positioning stops for the rear edge of the blade. This holds the blade as shown with its cutting edge 14 projecting forwardly from the front edge 50 of the plate 29 accurately lined up with the guide bar 18 and in the proper position with its cutting edge resting against the face of the grinding wheel 13 for accurate and effective grinding of this edge. In the grinding operation the holder 28 of the blade is merely slid back and forth longitudinally of the bar 18 to carry the cutting edge 14 of the blade across the face of the grinding wheel 13. The proper positioning of the blade with respect to the wheel may be effected by adjusting the bar 18 on the table 10 and raising or lowering the table by the usual adjusting means (not shown) employed for this purpose. It is also preferred to provide means for lubricating the top edge of the upright flange 20 of the bar 18. For this purpose the horizontal flange 31 of the guide 30 may be drilled as shown in Fig. 7 to receive a felt pad 51 resting on the top edge of the flange 20 and saturated with oil to thus provide lubrication for the purpose of facilitating the longitudinal back and forth sliding movement of the holder and plate during the grinding operation. One or more hand grips or handles 52 are provided on the top of the plate 29 to facilitate movement of the holder and blade.

To grind the end of a long narrow blade, such, for example, as that used in hand planes, a chisel or the like, it is merely clamped for example under the clamp 44, as shown in dotted lines 17 in Fig. 1 or full lines Fig. 3. To assist in properly lining up this blade so as to accurately place it at right angles to the bar 18, the top surface of the plate 29 may be provided with any desired number of gauge lines 52 accurately arranged at right angles to the bar 18, and the edge of the blade 17 may be properly positioned with respect to these lines to line up the blade, after which it is clamped in that position.

It will be understood from the above that the device is a very simple one and may be very quickly and accurately mounted on the table, for example, of a saw for grinding the blade. The same device can be used for grinding either the cutting edge of a long narrow blade such, for example, as those used in the rotating cutter of a planer or the like, or the end edge of a narrow blade such, for example, as those used in hand planes and similar devices. The device may be made at small cost, and does not require any separate power driving means or complicated mechanism as is now employed in grinding devices for these blades.

Having thus set forth the nature of my invention, I claim:

1. A grinding attachment of the character described comprising a guide bar to rest on a saw table, spaced clamps mounted on the bar to clamp it to opposite edges of the table, a holder for a blade to be ground resting on the top of the bar so as to be supported thereby and provided with guide means on opposite sides of the bar and cooperating therewith to guide the holder for movement longitudinally of the bar, said guide means being sufficiently spaced from the sides of the bar to permit limited vertical rocking movement of the holder on the bar, a second guide means on the holder spaced forwardly of the bar to rest on the table top to support the forward part of the holder during this movement, and clamping means on the holder for securing a blade to be ground in position to move with the holder across and in engagement with the face of a grinding wheel in the table.

2. A grinding attachment of the character described including a guide bar to rest on a saw table comprising an angle bar having a horizontal flange to rest on the table and an upright guide flange, means to clamp the bar on the table, a holder for a blade to be ground resting on the top edge of the upright flange so as to be supported thereby and including means cooperating with the opposite sides of this flange to guide the holder for longitudinal sliding movement, a second guide bar on the under side of the holder spaced forwardly of said angle bar to rest on the table top, and a clamp on the holder to clamp the blade with its edge extending forwardly to engage and move across the face of a grinding wheel in the table.

3. A grinding attachment of the character described including a guide bar to rest on a saw table comprising an angle bar having a horizontal flange to rest on the table and an upright guide flange, means to clamp the bar on the table, a holder for a blade to be ground comprising a plate resting on the top edge of the upright flange so as to be supported thereby, spaced guide means on the under side of the plate cooperating with the opposite sides of said flange to guide the plate for longitudinal movement and having sufficient clearance on opposite sides of the flange permitting limited vertical rocking movement of the holder on the flange, a second guide bar mounted on the under side of the plate spaced forwardly of the first bar to support the forward portion of the plate on the table, and a clamp on the top of the plate to releasably clamp a cutter blade on top of the plate with its cutting edge extending forwardly from the plate in position to engage and move across the face of a grinding wheel in the table.

4. A grinding attachment of the character described including a guide bar to rest on a saw table comprising an angle bar having a horizontal flange to rest on the table and an upright guide flange, means to clamp the bar on the table comprising a clamping member pivotally connected intermediate its length to the horizontal flange adjacent each end of the bar to swing about a vertical axis and a screw at one end of said member to engage an edge of the table and clamp the other end of said member against said edge, a blade holder resting on the upright flange and having guiding means on the opposite sides of and cooperating with said flange to guide the holder for longitudinal movement, and a clamp on the holder to clamp a cutter blade with its cutting edge extending forwardly to engage and move across the face of a grinding wheel in the table.

5. A grinding attachment of the character described comprising a guide bar to rest on a saw table, means to clamp the bar on the table, a holder for a blade to be ground resting on the bar and provided with guide means cooperating with opposite sides of the bar to guide the holder for longitudinal movement and having sufficient clearance to permit limited vertical rocking movement of the holder, a second guide on the under side of the holder spaced forwardly of the guide bar and including a yieldable resilient member to rest on the top of the table and form a yieldable support for the forward portion of the holder, and a clamp on the holder to clamp a cutter blade thereon with its cutting edge extending forwardly in position to engage and move across the face of a grinding wheel in the table.

6. A grinding attachment of the character described including a guide bar to rest on a saw table comprising an angle bar having a horizontal flange to rest on the table and an upright guide flange, clamps on the bar to secure it on the table, means for mounting the clamps at different longitudinal positions on the bar, a blade holder comprising a plate resting on top of said upright flange and provided with guide means on the opposite sides of and cooperating with this flange to guide the plate for longitudinal movement and having sufficient clearance to permit limited vertical rocking movement of the plate, a guide bar on the under side of the plate spaced forwardly of the first bar to support the plate on the table, and clamping means for a cutter blade on the table, and clamping means for a cutter blade on top of the plate including a stop to engage the rear edge of the blade to position it on the plate and a clamp to engage the top of the blade and clamp it to the plate with its cutting edge extending forwardly in position to engage and move across the face of a grinding wheel in the table.

NELSON J. RIVARD.

References Cited in the file of this patent

UNITED STATES PATENTS

| Number | Name | Date |
|---|---|---|
| 1,040,687 | Johnson | Oct. 8, 1912 |
| 1,206,791 | Anderson et al. | Dec. 5, 1916 |
| 1,275,203 | Bockshe | Aug. 13, 1918 |
| 1,279,025 | Shay | Sept. 17, 1918 |
| 1,694,560 | Parish | Dec. 11, 1928 |
| 1,915,247 | Holloway et al. | June 20, 1933 |
| 2,008,943 | Bodey | July 23, 1935 |
| 2,052,837 | Makaroff | Sept. 1, 1936 |
| 2,458,347 | Christiansen | Jan. 4, 1949 |
| 2,565,291 | Amendola | Aug. 21, 1951 |